(12) United States Patent
Yoneshige et al.

(10) Patent No.: US 11,686,022 B2
(45) Date of Patent: Jun. 27, 2023

(54) IMPACT RESISTANT, WRAPPABLE, CORRUGATED, MULTILAYERED WOVEN SLEEVE AND METHOD OF CONSTRUCTION THEREOF

(71) Applicant: FEDERAL-MOGUL POWERTRAIN LLC, Southfield, MI (US)

(72) Inventors: Yuki Yoneshige, Tokyo (JP); Tianqi Gao, Exton, PA (US); Xiaodan Qiu, Downingtown, PA (US); Danny Winters, Gordonville, PA (US); Emma Adamski, Pottstown, PA (US); Ritesh Mehbubani, Rogersford, PA (US); Leigh Krauser, Coatesville, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 81 days.

(21) Appl. No.: 17/173,134

(22) Filed: Feb. 10, 2021

(65) Prior Publication Data
US 2021/0249848 A1    Aug. 12, 2021

Related U.S. Application Data

(60) Provisional application No. 62/975,124, filed on Feb. 11, 2020.

(51) Int. Cl.
*H02G 3/04* (2006.01)
*D03D 3/02* (2006.01)
*D03D 1/00* (2006.01)

(52) U.S. Cl.
CPC ............ *D03D 3/02* (2013.01); *D03D 1/0043* (2021.05); *H02G 3/0481* (2013.01)

(58) Field of Classification Search
None
See application file for complete search history.

(56) References Cited

U.S. PATENT DOCUMENTS

| 8,502,069 B2 | 8/2013 | Holland et al. |
| 9,028,937 B2 | 5/2015 | Harris et al. |
| (Continued) | | |

FOREIGN PATENT DOCUMENTS

| CN | 103109008 A | 5/2013 |
| CN | 105143535 A | 12/2015 |
| (Continued) | | |

OTHER PUBLICATIONS

International Search Report, dated Apr. 26, 2021 (PCT/US2021/017589).

*Primary Examiner* — Shawn Mckinnon
(74) *Attorney, Agent, or Firm* — Robert L. Stearns; Dickinson Wright, PLLC

(57) ABSTRACT

A wrappable, corrugated woven sleeve and method of construction thereof is provided. The sleeve includes a wall having opposite edges wrapped about a central axis into overlapping relation with one another. The wall has a plurality of layers overlying one another. Each layer includes warp yarns extending generally parallel to the central axis woven with fill yarns extending generally transversely to the warp yarns. Each layer includes a plurality of annular first bands and a plurality of annular second bands alternating with one another along the length of the wall. The first bands of each layer include monofilament weft yarn and multifilament weft yarn and the second bands of each layer include only one of monofilament weft yarn or multifilament weft yarn. The first bands overlie one another to form peaks and the second bands B overlie one another to form valleys, such that the wall has a corrugated contour.

20 Claims, 3 Drawing Sheets

(56) References Cited

U.S. PATENT DOCUMENTS

| | | | |
|---|---|---|---|
| 9,091,002 | B2 | 7/2015 | Malloy et al. |
| 9,478,954 | B2 | 10/2016 | Yamaguchi et al. |
| 2004/0256016 | A1 | 12/2004 | Arima et al. |
| 2008/0169038 | A1 | 7/2008 | Sellis et al. |
| 2012/0037263 | A1 | 2/2012 | Malloy |
| 2013/0040081 | A1 | 2/2013 | Yoshimura et al. |
| 2014/0220846 | A1 | 8/2014 | Woodruff et al. |
| 2015/0030812 | A1 | 1/2015 | Teal |
| 2015/0056881 | A1 | 2/2015 | Zhang et al. |
| 2016/0309626 | A1 | 10/2016 | Simoens-Seghers et al. |
| 2017/0137978 | A1 | 5/2017 | Gao et al. |
| 2018/0057977 | A1 | 3/2018 | Zhang et al. |
| 2018/0057982 | A1 | 3/2018 | Qiu et al. |
| 2018/0062364 | A1 | 3/2018 | Qiu et al. |
| 2019/0308385 | A1 | 10/2019 | Itoh et al. |

FOREIGN PATENT DOCUMENTS

| | | |
|---|---|---|
| CN | 109312507 A | 2/2019 |
| EP | 2606168 A1 | 6/2013 |
| JP | H10168701 A | 6/1998 |
| WO | 2012145389 A2 | 10/2012 |

IMPACT RESISTANT, WRAPPABLE, CORRUGATED, MULTILAYERED WOVEN SLEEVE AND METHOD OF CONSTRUCTION THEREOF

CROSS-REFERENCE TO RELATED APPLICATION

This application claims the benefit of U.S. Provisional Application Ser. No. 62/975,124, filed Feb. 11, 2020, which is incorporated herein by reference in its entirety.

BACKGROUND OF THE INVENTION

1. Technical Field

This invention relates generally to textile sleeves for protecting elongate members, and more particularly to impact resistant, corrugated, wrappable multilayered woven tubular sleeves.

2. Related Art

It is known to contain elongate members, such as wires, wire harnesses, cables and conduits of various types in woven sleeves to provide protection to the elongate members against impact and abrasion, fluid and thermal affects. In applications where high impact resistance is needed to prevent damage to the sleeve and the contents therein, wrappable woven sleeves having multiple layers are known. Each of the layers of the multilayered wall are typically formed having the same, non-varying, uniform weave pattern over their entirety, and thus, upon wrapping the wall of the sleeve to bring opposite edges into overlapping relation with one another, thereby encircling the elongate being protected therein, the multiple layers typically result in the sleeve being stiff and inflexible, thereby making it difficult to route the sleeve along a meandering path, particularly without causing the sleeve to buckle and/or open along overlapping edges.

Accordingly, what is needed is a wrappable, multilayered woven sleeve that provides enhanced protection to an elongate member contained therein, particularly against impact, abrasion and contamination, while being able to be freely routed about meandering paths while maintaining its wrapped configuration without buckling and/or opening along the overlapping edges, while maintaining an aesthetically pleasing appearance, being economical in manufacture and assembly, and exhibiting a long and useful life.

SUMMARY OF THE INVENTION

One aspect of the disclosure provides a wrappable, corrugated, multilayered woven sleeve for routing and protecting elongate members. The sleeve includes an elongate multilayered wall having opposite edges extending lengthwise between opposite ends. The opposite edges are wrappable about a central axis into overlapping relation with one another to bound a central cavity. The wall has a plurality of layers extending in overlying relation with one another between the opposite ends. Each of the layers include warp yarns extending generally parallel to the central axis woven with fill yarns extending generally transversely to the warp yarns. Each of the layers include a plurality of first annular bands, referred to hereafter as annular bands A, and a plurality of second annular bands, referred to hereafter as annular bands B, wherein the annular bands A, B alternate with one another along each layer and along the length of the wall. The annular bands A of each layer include monofilament weft yarn and multifilament weft yarn and the annular bands B of each layer include only one of monofilament weft yarn or multifilament weft yarn. The annular bands A of each layer are radially aligned in overlapping relation with one another and the annular bands B of each layer are radially aligned in overlapping relation with one another. The annular bands A of each layer form peaks, while the annular bands B of each layer form valleys, such that the wall has a corrugated contour, thereby enhancing the flexibility of the wall to allow it to be routed over meandering paths without kinking.

In accordance with another aspect of the invention, the multilayered wall includes a radially outermost layer, a radially innermost layer, and at least one intermediate layer sandwiched between the radially outermost layer and the radially innermost layer.

In accordance with another aspect of the invention, at least one of the radially outermost layer, the radially innermost layer, and the intermediate layer (s) can have a different weave pattern from at least one of the other layers.

In accordance with another aspect of the invention, the radially outermost layer, the radially innermost layer, and the intermediate layer (s) can be woven from any one of a plain weave pattern, a twill weave pattern, a basket weave pattern, and a satin weave pattern, wherein at least some or all of the layers may be woven with the same weave pattern, or at least some or all of the layers may be woven with a different weave pattern.

In accordance with another aspect of the invention, a method of constructing a wrappable, corrugated, multilayered woven sleeve is provided. The method includes weaving an elongate wall having opposite edges extending lengthwise between opposite ends, with the elongate wall being configured to be wrapped about a central axis to bring the opposite edges into overlapping relation with one another to bound a central cavity. Further, weaving the wall to include a plurality of layers extending in overlying relation with one another between the opposite edges and the opposite ends, with each of the layers including warp yarns extending generally parallel to the central axis woven with fill yarns extending generally transversely to the warp yarns. Further yet, weaving each of the layers including a plurality of annular bands A and a plurality of annular bands B, with the annular bands A and the annular bands B alternating with one another along the length of the wall. Further yet, weaving the annular bands A of each layer including monofilament weft yarn and multifilament weft yarn and weaving the annular bands B of each layer including only one of monofilament weft yarn or multifilament weft yarn. Further, radially aligning the annular bands A of each layer in overlapping relation with one another and radially aligning the annular bands B of each layer in overlapping relation with one another, wherein the annular bands A of each layer form peaks and the annular bands B of each layer form valleys, such that the wall has a corrugated contour, thereby enhancing the flexibility of the wall to allow it to be routed over meandering paths without kinking.

In accordance with another aspect of the invention, the method can further include weaving the multilayered wall including a radially outermost layer, a radially innermost layer, and at least one intermediate layer sandwiched between the radially outermost layer and the radially innermost layer.

In accordance with another aspect of the invention, the method can further include weaving at least one of the radially outermost layer, the radially innermost layer, and the intermediate layer(s) having a different weave pattern from at least one of the other layers.

In accordance with another aspect of the invention, the method can further include weaving the radially outermost layer, the radially innermost layer, and the intermediate layer(s) having any one of a plain weave pattern, a twill weave pattern, a basket weave pattern, and a satin weave pattern, wherein at least some or all of the layers may be woven with the same weave pattern, or at least some or all of the layers may be woven with a different weave pattern.

In accordance with another aspect of the invention, the method can further include weaving the wall including at least one of heat-settable yarns and heat-shrinkable yarns, wherein the heat-shrinkable yarns are provided as high length shrinkage yarns having a shrinkage in length between 4-20% or greater upon being exposed to a heat-treatment process, thereby causing the wall to take on an increased density, thus, increasing the cut resistance, impact resistance, and overall protective attributes of the wall.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
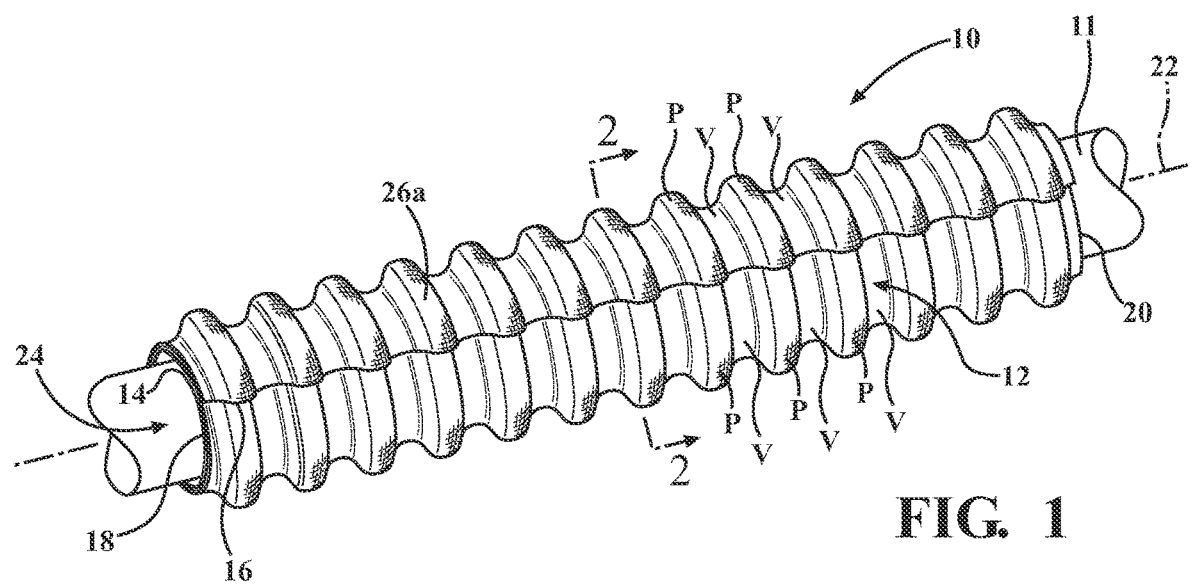
FIG. 1 is a schematic perspective view of a wrappable, multilayered, woven sleeve constructed in accordance with one aspect of the invention shown wrapped about an elongate member to be protected.
Figure 2:
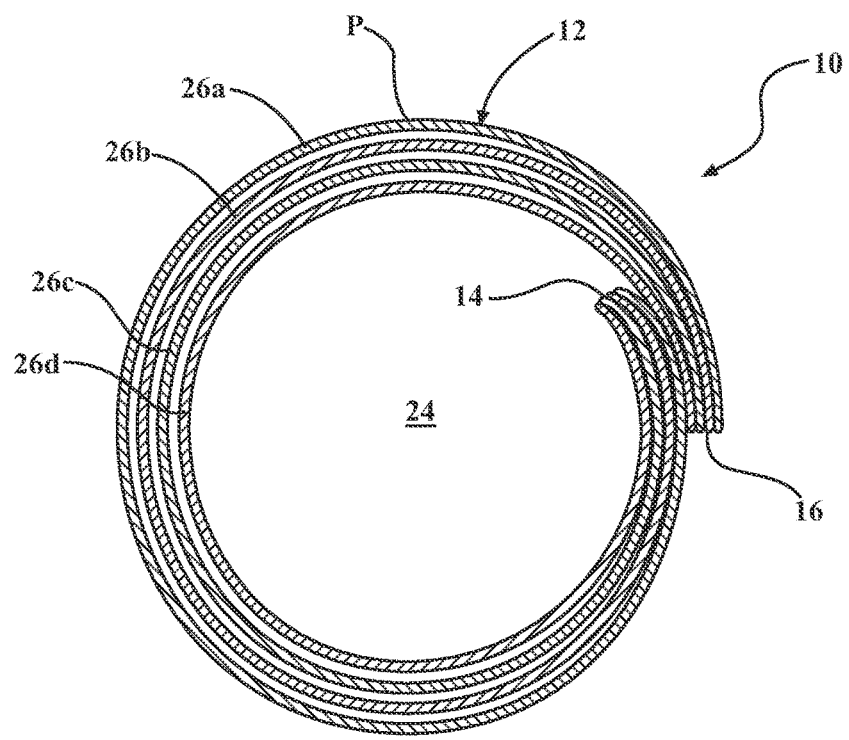
FIG. 2 is a cross-sectional view taken generally along the line 2-2 of FIG. 1 with the elongate member removed.
Figure 3:
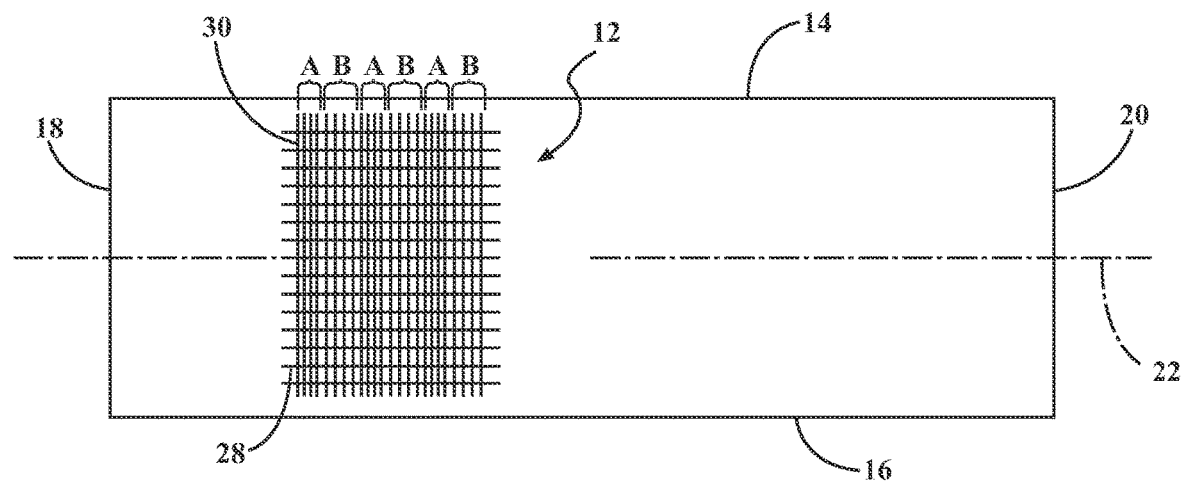
FIG. 3 is a schematic plan view of a layer of a wall of the sleeve of FIG. 1 shown in a flattened state prior to being wrapped.
Figure 3A:
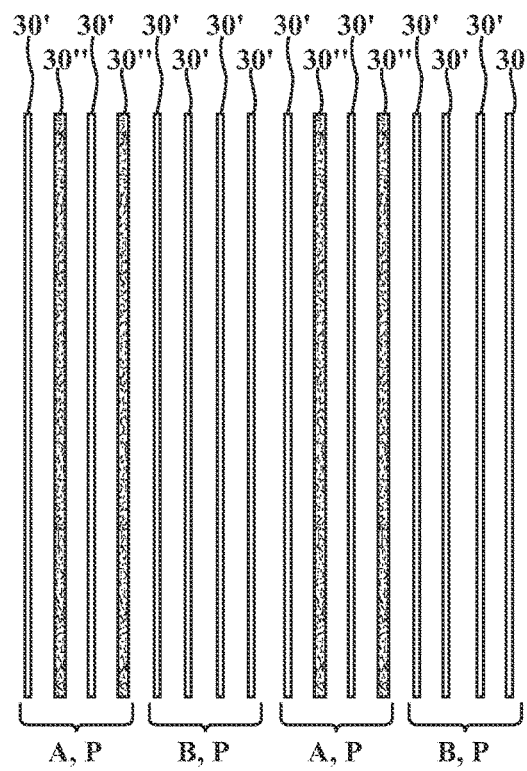
FIG. 3A is an enlarged, fragmentary view of the wall of FIG. 3 illustrating bands of weft yarns thereof with warp yarns omitted for clarity purposes only.
Figure 3B:
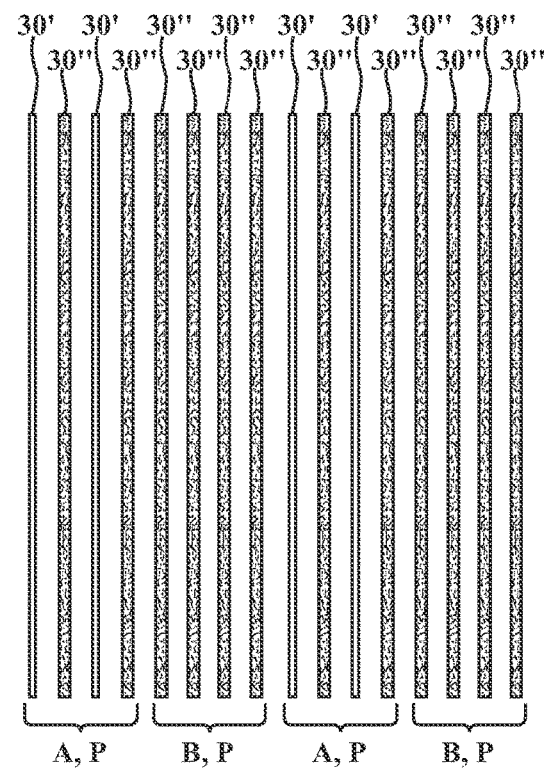
FIG. 3B is a view similar to FIG. 3A illustrating a wall constructed in accordance with another aspect of the disclosure.

Referring in more detail to the drawings, FIG. 1 schematically illustrates a flexible, wrappable, multilayered, woven sleeve, referred to hereafter as sleeve 10, constructed in accordance with one aspect of the invention having a corrugated wall 12 wrapped about an elongate member 11 to be protected, such as a wire harness, conduit, or the like. The wall 12 includes has opposite edges 14, 16 extending lengthwise between opposite ends 18, 20. The opposite edges 14, 16 are wrappable about a central axis 22 into overlapping relation with one another to bound a central cavity 24, through which the elongate member 11 extends and in which the elongate member 11 is protected against impact forces, such as may be experienced in a vehicle crash, abrasion, and ingress of contamination, by way of example and without limitation. The wall 12 has a plurality of layers, including at least a pair of layers and shown in FIG. 2 as four layers 26a, 26b, 26c, 26d, by way of example and without limitation, extending in overlying, abutting relation with one another between the opposite ends 18, 20. Each of the layers 26a, 26b, 26c, 26d, as best shown for one of the layers in FIG. 3, with it to be understood that each layer can be constructed having the same or substantially the same construction (substantially is intended to mean slight differences could exist between the layers, such as weave pattern, for example, though it is to be further understood that the underlying premise of the disclosure is maintained within each layer to form a corrugated wall, as discussed further below) include warp yarns 28 extending generally parallel to the central axis 22 woven with weft yarns, also referred to as fill yarns 30, extending generally transversely to the warp yarns 28. Upon wrapping the opposite edges 14, 16 into overlapping relation with one another, one of the plurality of layers forms a radially outermost layer 26a and one of the plurality of layers forms a radially innermost layer 26d. Each of the layers 26a, 26b, 26c, 26d include a plurality of annular first bands A and a plurality of annular second bands B alternating with one another along the length of the wall 12, as shown in FIGS. 3 and 3A. The annular first bands A of each layer 26a, 26b, 26c, 26d include monofilament weft yarn 30' and multifilament weft yarn 30" and the annular second bands B of each layer 26a, 26b, 26c, 26d include only one of monofilament weft yarn 30' or multifilament weft yarn 30", shown in FIG. 3A as monofilament weft yarn 30' and shown in FIG. 3B as multifilament weft yarn 30". The annular first bands A of each layer 26a, 26b, 26c, 26d are radially aligned in overlapping relation with one another and the annular second bands B of each layer 26a, 26b, 26c, 26d are radially aligned in overlapping relation with one another. The annular first bands A of each layer 26a, 26b, 26c, 26d form peaks P having a generally convex outer surface contour, while the annular second bands B of each layer 26a, 26b, 26c, 26d form valleys V having a generally concave outer surface contour, such that the wall 12 has a corrugated contour, including peaks P and valleys V alternating with one another along its length, thereby enhancing the bending flexibility of the wall 12 to allow it to be routed over winding, meandering paths in zig-zag fashion, including around sharp bends and corners, without kinking.

To facilitate maintaining the wall 12 in its wrapped state about the elongate member 11, at least some of the fill yarns 30 within the layers 26a, 26b, 26c, 26d can be provided as heat-settable fill yarns, and can be provided as monofilament weft yarn 30' and/or as multifilament weft yarn 30". As such, any suitable heat treat process causes the wall 12 to take on a heat-set tubular shape to remain biased in its wrapped tubular state absent an externally applied force to the opposite edges 14, 16, wherein an externally applied force can be applied to separate the opposite edges 14, 16 away from one another to insert the elongate member 11 into the cavity 24 during assembly and to remove the elongate member 11 from the cavity during service, whereupon removal of the externally applied force allows the opposite edges 14, 16 to automatically move back into overlapping relation with one another.

To enhance the protective attributes of the wall 12, including its impact resistance, cut-through resistance, and resistance to ingress of contamination, at least some of the warp 28 and/or fill yarns 30 within the layers 26a, 26b, 26c, 26d can be provided as high shrinkage yarn, with high shrinkage meaning shrinking in length between 4-20% or more. As such, any suitable heat treat process causes the wall 12 to become increased in density via the shrinking of the high shrinkage yarn(s).

Figure 4:
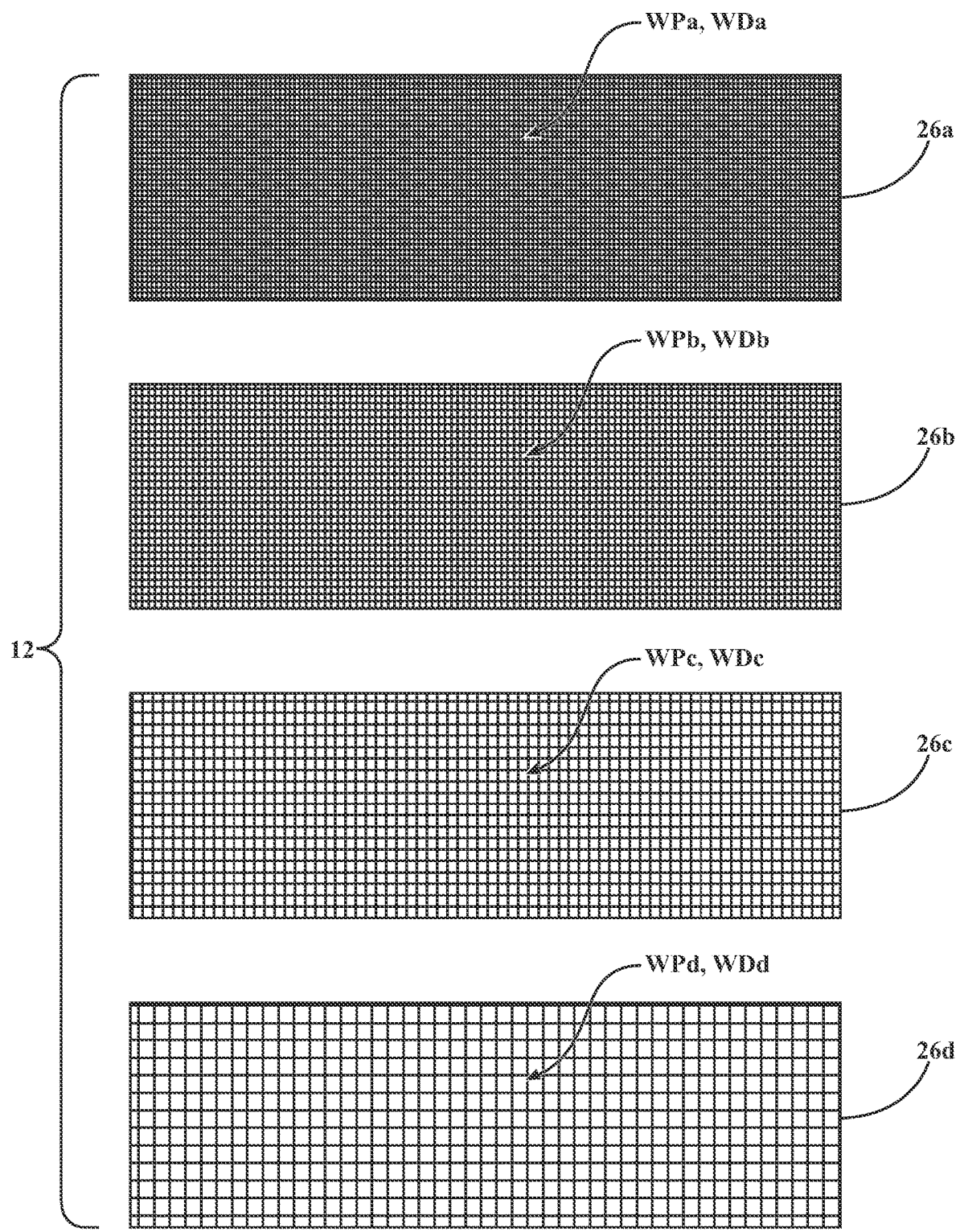
FIG. 4 is a schematic plan view of a plurality of layers of the wall of FIG. 3 illustrating different weave patterns and weave densities between the plurality of layers.

In accordance with an aspect of the disclosure, as shown in FIG. 4, the radially outermost layer 26a can be woven having a first weave pattern WPa having a first weave tightness (density) WDa and the radially innermost layer 26d can be woven having a second weave pattern WPd having a second weave tightness (density) WDd, with the first weave tightness (density) WDa being greater than the second weave tightness (density) WDd. As such, upon heat-setting the layers 26a, 26d, the innermost layer 26d is caused to take on a heat-set with without having wrinkles formed therein. It is to be recognized that the intermediate layers 26b, 26c sandwiched between the radially outermost layer 26a and the radially inner most layer 26d can be woven having respective weave patterns WPb, WPc decreasing in weave tightness (density) relative to one another such that the weave tightnesses (densities) WDa, WDb, WDc, WDd decrease relative to one another progressively from the radially outermost layer 26a to the radially innermost layer 26d. Accordingly, WDa>WDb>WDc>WDd. As a result, upon heat-setting the wall 12, each of the layers 26a, 26b, 26c, 26d remains smooth and free from wrinkles.

In addition, within the aspects discussed above, the warp yarns 28 and/or fill yarns 30 can be provided as high tenacity yarns, such as from high tenacity polyethylene terephthalate (PET), para-aramid, liquid-crystal polymer, and the like. The high tenacity, defined herein by grams/denier, is provided being between 4-10 grams/denier, which provides increased resistance to cut-through and absorbs an increased amount of impact energy without breaking, thereby provided optimal crash resistance and protection to the elongate member 11. To further yet increase the density and impact resistance of the wall 12, at least some of the warp yarns 28 and/or fill yarns 30 can be provided having a high shrinkage, wherein high shrinkage is defined herein as shrinking lengthwise between 4-20% or more of a pre-treated, pre-shrunken length, whereupon shrinking the yarns, the yarns 28, 30 are drawn together to increase the density of the wall 12.

In accordance with an aspect of the disclosure, a method of constructing a wrappable, multilayered (two layers or more) woven sleeve 10 is provided. The method includes weaving an elongate wall 12 having opposite edges 14, 16 extending lengthwise between opposite ends 18, 20, with the elongate wall 12 being configured to be wrapped about a central axis 22 to bring the opposite edges 14, 16 into overlapping relation with one another to bound a central cavity 24. Further, the method includes weaving the wall 12 to include a plurality of layers 26a, 26b, 26c, 26d extending in overlying relation with one another between the opposite ends 18, 20 and between the opposite edges 14, 16. The method further includes weaving each of the layers 26a, 26b, 26c, 26d including warp yarns 28 extending generally parallel to the central axis 22 being woven with fill yarns 30 extending generally transversely to the warp yarns 28, with one of the plurality of layers 26a being woven to form a radially outermost layer and one of the plurality of layers 26d being woven to form a radially innermost layer. Further yet, weaving each of the layers 26a, 26b, 26c, 26d including a plurality of first annular bands A and a plurality of second annular bands B, with the annular bands A and the annular bands B alternating with one another along each of the layers 26a, 26b, 26c, 26d and along the length of the wall 12. Further yet, weaving the annular bands A of each layer 26a, 26b, 26c, 26d including both monofilament weft yarn 30' and multifilament weft yarn 30" and weaving the annular bands B of each layer 26a, 26b, 26c, 26d including only one of monofilament weft yarn 30' or multifilament weft yarn 30". Further, radially aligning the annular bands A of each layer 26a, 26b, 26c, 26d in overlapping relation with one another and radially aligning the annular bands B of each layer 26a, 26b, 26c, 26d in overlapping relation with one another, wherein the annular bands A of each layer 26a, 26b, 26c, 26d form peaks P and the annular bands B of each layer 26a, 26b, 26c, 26d form valleys V, such that the wall 12 has a corrugated contour along its length, thereby enhancing the flexibility of the wall 12 to allow it to be routed over meandering paths without kinking.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A wrappable, multilayered woven sleeve for routing and protecting elongate members, comprising:
a wall having opposite edges extending lengthwise between opposite ends, said opposite edges being wrappable about a central axis into overlapping relation with one another to bound a central cavity, said wall having a plurality of layers extending in overlying relation with one another, each of said layers including warp yarns extending generally parallel to the central axis woven with fill yarns extending generally transversely to said warp yarns, each of said layers including a plurality of annular first bands and a plurality of annular second bands, said first bands and said second bands of each of said layers alternating with one another along the length of the wall, said first bands of each layer including monofilament weft yarn and multifilament weft yarn and said second bands of each layer including only one of monofilament weft yarn or multifilament weft yarn, said first bands of each layer being radially aligned in overlapping relation with one another and said second bands of each layer being radially aligned in overlapping relation with one another, said first bands of each layer forming peaks and said second bands of each layer forming valleys, said peaks and said valleys alternating with one another along said central axis.

2. The wrappable, multilayered woven sleeve of claim 1, wherein said plurality of layers includes a radially outermost layer, a radially innermost layer, and at least one intermediate layer sandwiched between the radially outermost layer and the radially innermost layer.

3. The wrappable, multilayered woven sleeve of claim 2, wherein at least one of the radially outermost layer, the radially innermost layer, and the at least one intermediate layer has a different weave pattern from at least one of the other layers.

4. The wrappable, multilayered woven sleeve of claim 3, wherein the radially outermost layer, the radially innermost layer, and the at least one intermediate layer are woven from any one of a plain weave pattern, a twill weave pattern, a basket weave pattern, and a satin weave pattern.

5. The wrappable, multilayered woven sleeve of claim 4, wherein at least some of the layers are woven with the same weave pattern.

6. The wrappable, multilayered woven sleeve of claim 2, wherein at least some of the layers are woven with the same weave pattern.

7. The wrappable, multilayered woven sleeve of claim 6, wherein all of the layers are woven with the same weave pattern.

8. The wrappable, multilayered woven sleeve of claim 1, wherein said second bands of each layer include only monofilament weft yarn.

9. The wrappable, multilayered woven sleeve of claim 1, wherein said second bands of each layer include only multifilament weft yarn.

10. The wrappable, multilayered woven sleeve of claim 2, wherein the radially outermost layer has a first weave density and the radially innermost layer has a second weave density, the first weave density being greater than the second weave density.

11. The wrappable, multilayered woven sleeve of claim 1, wherein the opposite edges are biased into overlapping relation with one another by at least one heat-set yarn.

12. A method of constructing a wrappable, multilayered woven sleeve, comprising:
   weaving an elongate wall including a plurality of overlying layers having opposite edges extending lengthwise along a central axis between opposite ends;
   weaving each of the layers including warp yarns extending generally parallel to the central axis with fill yarns extending generally transversely to the warp yarns;
   weaving each of the layers including a plurality of annular first bands and a plurality of annular second bands alternating with one another along the length of the wall;
   weaving the annular first bands of each layer including monofilament weft yarn and multifilament weft yarn;
   weaving the annular second bands of each layer including only one of monofilament weft yarn or multifilament weft yarn;
   radially aligning the annular first bands of each layer in overlapping relation with one another;
   radially aligning the annular second bands of each layer in overlapping relation with one another; and
   causing the annular first bands of each layer to form peaks and the annular second bands of each layer to form valleys to provide the wall having a corrugated contour.

13. The method of claim 12, further including weaving the plurality of layers to include a radially outermost layer, a radially innermost layer, and at least one intermediate layer sandwiched between the radially outermost layer and the radially innermost layer.

14. The method of claim 13, further including weaving at least one of the radially outermost layer, the radially innermost layer, and the at least one intermediate layer having a different weave pattern from at least one of the other layers.

15. The method of claim 13, further including weaving the radially outermost layer, the radially innermost layer, and the at least one intermediate layer having any one of a plain weave pattern, a twill weave pattern, a basket weave pattern, and a satin weave pattern.

16. The method of claim 15, further including weaving the radially outermost layer, the radially innermost layer, and the at least one intermediate layer having the same weave pattern.

17. The method of claim 15, further including weaving the radially outermost layer, the radially innermost layer, and the at least one intermediate layer each having a different weave pattern.

18. The method of claim 13, further including weaving the radially outermost layer having a first weave density and weaving the radially innermost layer having a second weave density, wherein the first weave density is greater than the second weave density.

19. The method of claim 12, further including weaving the wall including at least one of heat-settable yarns and heat-shrinkable yarns.

20. The method of claim 19, further including providing the heat-shrinkable yarns to shrink in length at least 4% upon being exposed to a heat-treatment process.

* * * * *